(12) United States Patent
Liu

(10) Patent No.: US 10,274,110 B1
(45) Date of Patent: Apr. 30, 2019

(54) S-SHAPED LOCKING FASTENER STRUCTURE

(71) Applicant: Hsiao-Han Liu, Guangdong (CN)

(72) Inventor: Hsiao-Han Liu, Guangdong (CN)

( * ) Notice: Subject to any disclaimer, the term of this patent is extended or adjusted under 35 U.S.C. 154(b) by 0 days.

(21) Appl. No.: 15/995,145

(22) Filed: Jun. 1, 2018

(51) Int. Cl.
*F16L 3/00* (2006.01)
*F16L 3/12* (2006.01)

(52) U.S. Cl.
CPC ................... *F16L 3/1215* (2013.01)

(58) Field of Classification Search
CPC ............. H02G 3/32; B60R 2011/0071; B60R 16/0207; F16L 3/12
USPC ..... 248/49, 62, 65, 70, 74.1, 74.2, 74.4, 200
See application file for complete search history.

(56) References Cited

U.S. PATENT DOCUMENTS

| | | | |
|---|---|---|---|
| 1,808,628 A * | 6/1931 | Bond | A47H 1/104 248/214 |
| 4,886,228 A * | 12/1989 | Kennedy | H02G 3/24 248/74.1 |
| D329,588 S * | 9/1992 | Michel, Jr. | D8/395 |
| 5,524,327 A * | 6/1996 | Mickel | F16L 3/00 24/115 A |
| D477,770 S * | 7/2003 | Baker | D8/373 |
| 7,784,744 B2 * | 8/2010 | Becker | F16L 3/02 248/218.4 |
| 8,091,846 B1 * | 1/2012 | Britner | B25H 1/00 248/219.3 |
| D759,474 S * | 6/2016 | Pittman | D8/395 |
| 2001/0038059 A1* | 11/2001 | Dick | F16L 3/1226 248/65 |
| 2011/0226911 A1* | 9/2011 | Lambert | F16L 3/237 248/65 |

* cited by examiner

*Primary Examiner* — Steven M Marsh

(57) ABSTRACT

The present invention relates to the field of locking fasteners for pipes, in particular to an S-shaped locking fastener structure comprising a locking fastener body which is provided with a vertical fastening plate, wherein extension rods, through which the length of the fastening plate is adjusted, are connected in the middle of the fastening plate. The S-shaped locking fastener structure according to the present invention is convenient to assemble and disassemble, and can be fastened to the pipes without screw fixation. Moreover, the locking fastener has a wide application range, and angles of upper and lower edges thereof can be designed into multiple angles according to different needs, so that the angles for fastening a box body are diversified.

7 Claims, 3 Drawing Sheets

S-SHAPED LOCKING FASTENER STRUCTURE

BACKGROUND OF THE INVENTION

The present invention relates to the field of locking fasteners for pipes, in particular to an S-shaped locking fastener structure.

Existing common locking fasteners for pipe fittings generally include a steel pipe, a C-shaped locking fastener, a T-shaped locking fastener, and the like. For example, the C-shaped locking fastener is vertically connected to a pipe wall at a left end of the steel pipe diameter, a cross section of the C-shaped locking fastener is C-shaped with one side open, a reinforcing rib can also be arranged on a side face of the C-shaped locking fastener, and the T-shaped locking fastener is vertically connected to a pipe wall at a right end of the steel pipe diameter and in a position deviating to the radius. The locking fastener for pipe fittings has a wide application field, e.g., steel pipe piles of the locking fastener are lapped with each other to form an arc or round shape to play a role as a hanger in the bathroom or balcony.

At present, there are many problems to be solved and great defects in the expandable technical links, which are mainly reflected in the fact that the locking fastener applied to the pipes usually adopts a locking fastener which is locked by screws so as to fasten the locking fastener to the pipes. Such locking fastener is extremely inconvenient to assemble and disassemble. At the same time, when the pipe is a round pipe or both ends of the pipe fail to pass through the traditional locking fastener, the locking position for the pipe is limited.

In addition, the current locking structure cannot be fastened at various angles to the box body according to different usage requirements, so as a result the fastening angle does not have diversification.

BRIEF SUMMARY OF THE INVENTION

In order to solve the above problems, the present invention provides an S-shaped locking fastener structure which has diversified fastening angles, is convenient to assemble and disassemble and is conducive to enhancing the strength for fastening a box body and also the locking strength of pipe fittings.

In order to achieve the above objectives, a technical solution employed in the present invention is as follows: an S-shaped locking fastener structure is provided, including a locking fastener body which is provided with a vertical fastening plate, wherein a box fastening element which is provided with a fastening bayonet is arranged on a front side of the fastening plate, and a pipe locking element, which is a cylindrical locking fastener with a bevel notch, is arranged on a rear side thereof; the bevel notch divides the locking fastener into a top locking ring and a bottom locking ring from top to bottom, and extension rods, through which the length of the fastening plate is adjusted, are connected in the middle of the fastening plate.

In combination with the technical solution of the present invention, the following technical features are also included.

Specifically, the fastening bayonet includes an upper edge and a lower edge, and side baffles are arranged on both sides of the upper edge respectively.

Specifically, the upper edge and the two side baffles form an upper bayonet structure with an I-shaped cross section.

Specifically, the upper bayonet structure is clamped to an external box body through at least three contact surfaces.

Specifically, the lower edge is provided with a horizontal plate perpendicular to the fastening plate, and is in direct contact with the box body to form a lower contact surface.

A wear-resistant elastic silica gel layer is arranged on an inner surface of an arc-shaped locking hole.

Specifically, the extension rods are tubular extension rods embedded in the fastening plate; and the distance between the top locking ring and the bottom locking ring is adjusted by the extension rods.

Specifically, the fastening plate includes an upper fastening plate and a lower fastening plate which are connected by the extension rods, a joint at a lower end of the upper fastening plate is of a tilt angle structure, several rack slots matched with the tilt angle structure are arranged at a joint at an upper end of the lower fastening plate, and the tilt angle structure and the rack slots form a buckle structure.

The bevel notch in the middle is internally loaded with a pipe, and the angle thereof can be designed to be horizontal, vertical or arbitrary, and an angle at which the pipe is inserted in is based on the notch angle.

The beneficial effect of the present invention is that: the S-shaped locking fastener structure according to the present invention is convenient to assemble and disassemble, and can be fixed on the pipes without screw fixation. Moreover, the locking fastener has a wide application range, and the angle thereof can be adjusted by twisting horizontally when the pipe is a round pipe. When both ends of the pipe fail to pass through the traditional locking fastener, the S-shaped locking fastener can be placed at any position on the pipe through the bevel notch.

Secondly, if the locking fastener needs to be mounted on the pipe through the bevel notch when the pipe is fixed on the wall, the bevel notch of the locking fastener is aligned with the pipe, and the locking fastener is squeezed, so that the locking fastener body can wrap the pipe, and then a top or tail end of the locking fastener is squeezed, so that the locking fastener body can fasten the pipe, thus achieving the purpose of locking the pipe by the locking fastener. The box body can be fastened by arranging the upper edge and the lower edge on the locking fastener, and angles of the upper and lower edges thereof can be designed into multiple angles according to different needs, so that the angles for fastening the box body are diversified.

In addition, the upper bayonet structure can be clamped to the external box body through three contact surfaces by arranging the upper edge, thereby increasing the friction force with the contact surfaces of the box body and enhancing the fastening strength of the box body. It is also possible to fasten the pipe fitting in both upper and lower directions by arranging the S-shaped locking fastener, thus enhancing the locking strength.

DETAILED DESCRIPTION OF THE INVENTION

Embodiment 1

Figure 1:
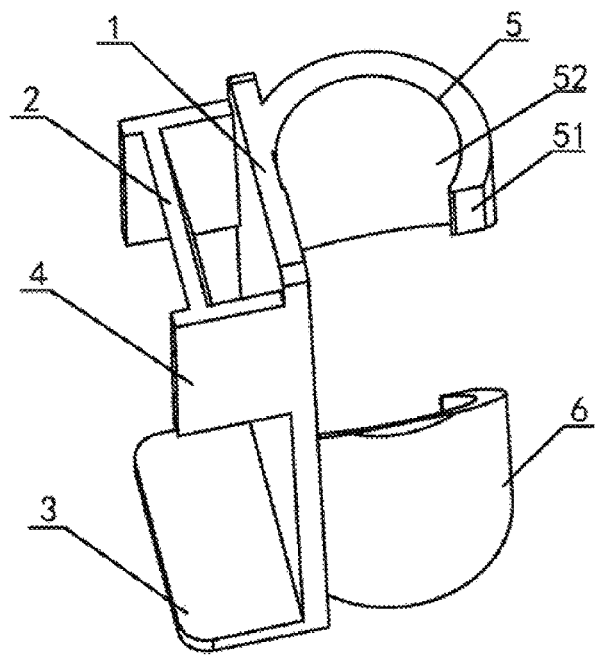
FIG. 1 is a structural diagram of an S-shaped locking fastener structure according to an embodiment of the present invention.
Figure 2:
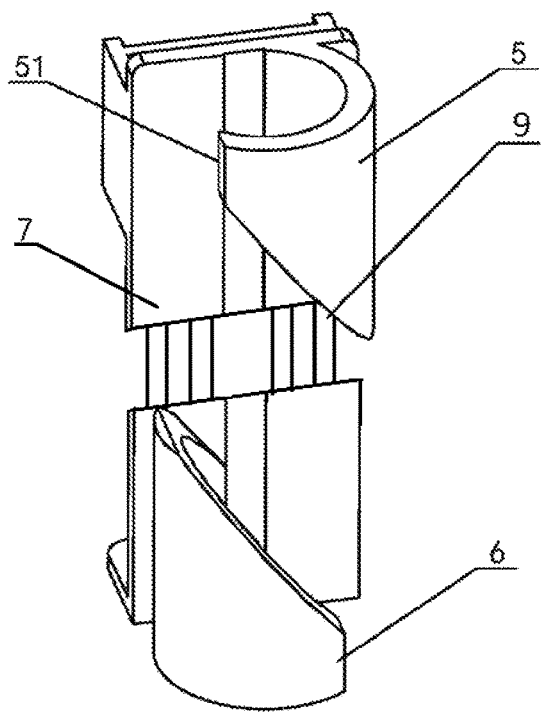
FIG. 2 is a schematic side view of the S-shaped locking fastener structure according to the embodiment of the present invention.
Figure 3:
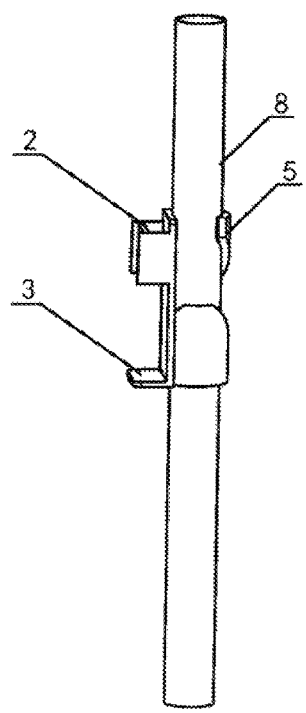
FIG. 3 is a schematic diagram when the S-shaped locking fastener structure according to the embodiment of the present invention is in a use state.
Figure 4:
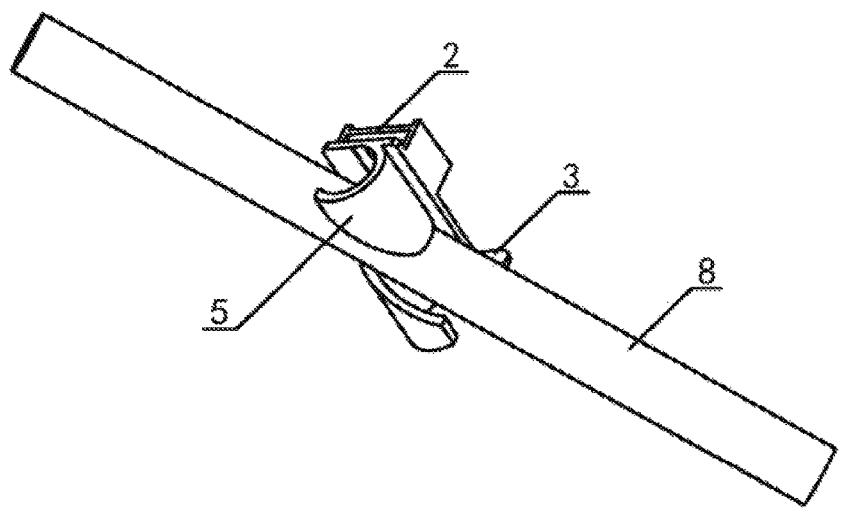
FIG. 4 is a schematic diagram when the S-shaped locking fastener structure according to the embodiment of the present invention is tilted.

Please refer to FIGS. 1 to 4, the specific embodiment of the present invention relates to an S-shaped locking fastener structure, including a locking fastener body 1 which is provided with a vertical fastening plate 8, wherein a box fastening element which is provided with a rectangular fastening bayonet is arranged on a front side of the fastening plate 8, and a pipe locking element, which is a cylindrical locking fastener with a bevel notch, is arranged on a rear side thereof; the bevel notch divides the locking fastener into a top locking ring 5 and a bottom locking ring 6 from top to bottom, and extension rods 9, through which the length of the fastening plate 8 is adjusted, are connected in the middle of the fastening plate 8.

Further, the fastening bayonet includes an upper edge 2 and a lower edge 3, and side baffles 4 are arranged on both sides of the upper edge 2 respectively. The upper edge 2 and the two side baffles 4 form an upper bayonet structure with an I-shaped cross section, and the upper bayonet structure is clamped to an external box body through three contact surfaces, thereby increasing the friction force with the contact surfaces of the box body and enhancing the fastening strength of the box body.

The lower edge 3 is provided with a horizontal plate perpendicular to the fastening plate 8, and is in direct contact with the box body to form a lower contact surface.

In the specific embodiment 1, the pipe locking element consists of a cylindrical locking fastener with several notches, and a layer of bevel notch 7, which divides the locking fastener into two locking rings (i.e., the top locking ring 5 and the bottom locking ring 6) from top to bottom, is arranged in the middle of the locking fastener, and an outer end of each locking ring is open.

Specifically, the outer ends of the top locking ring 5 and the bottom locking ring 6 are respectively provided with a clamping point 51. At the same time, an arc-shaped locking hole 52 is formed between the top locking ring 5 and the bottom locking ring 6 and the fixing plate 8 respectively.

Specifically, the pipe is internally loaded in the bevel notch 7 and rotated to the inside of the locking ring, so that the locking holes 52 of the top locking ring 5 and the bottom locking ring 6 respectively clamp an outer wall surface of the pipe at a corresponding section, thereby eventually realizing that the overall locking fastener structure and the pipe are fastened and locked.

Embodiment 2

Please refer to FIGS. 1 to 4, the specific embodiment of the present invention relates to an S-shaped locking fastener structure, including a locking fastener body 1 which is provided with a vertical fastening plate 8, wherein a box fastening element which is provided with a rectangular fastening bayonet is arranged on a front side of the fastening plate 8, and a pipe locking element, which is a cylindrical locking fastener with a bevel notch, is arranged on a rear side thereof; the bevel notch divides the locking fastener into a top locking ring 5 and a bottom locking ring 6 from top to bottom, and extension rods 9, through which the length of the fastening plate 8 is adjusted, are connected in the middle of the fastening plate 8.

Specifically, a layer of bevel notch 7, which divides the locking fastener into two locking rings (i.e., the top locking ring 5 and the bottom locking ring 6) from top to bottom, is arranged in the middle of the pipe locking element, and an outer end of each locking ring is open. According to the S-shaped locking fastener structure in the specific embodiment 2, an arc-shaped locking hole 52 is formed between the top locking ring 5 and the bottom locking ring 6 and the fixing plate 8 respectively. The pipe is loaded in the bevel notch 7 and rotated to the inside of the locking ring, so that the locking holes 52 of the top locking ring 5 and the bottom locking ring 6 respectively clamp an outer wall surface of the pipe at a corresponding section, thereby eventually realizing that the overall locking fastener structure and the pipe are fastened and locked.

Further, a layer of bevel notch 7, which divides the pipe locking element into S-shaped locking fasteners from top to bottom, is arranged in the middle of the pipe locking element, and an outer end of each locking fastener is open. The pipe is internally loaded in the bevel notch 7 and rotated to the inside of the S-shaped locking fastener body, so that the S-shaped locking fastener body clamps an outer wall surface of the pipe, thereby eventually realizing that the S-shaped locking fastener structure and the pipe are fastened and locked in both upper and lower directions.

Embodiment 3

Figure 5:
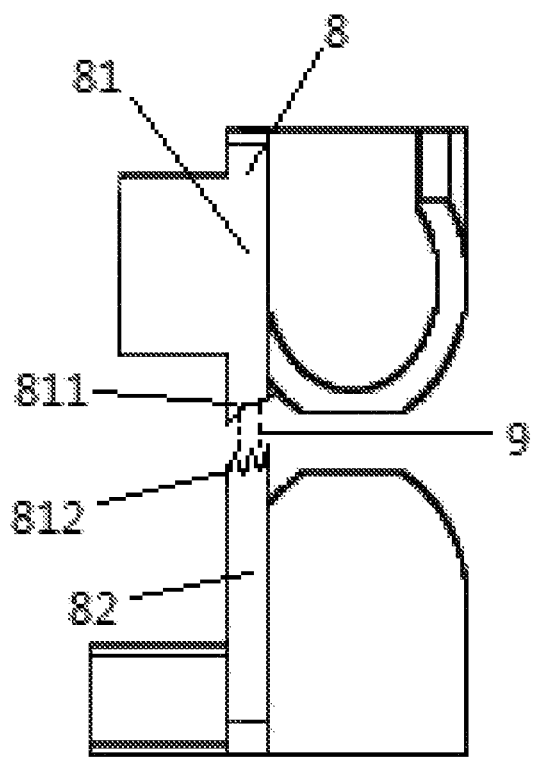
FIG. 5 is a structural diagram of a buckle structure according to the embodiment of the present invention,
in which
1—Locking fastener body; 2—Upper edge; 3—Low edge; 4—Side baffle; 5—Top locking ring; 51—Clamping point; 52—Locking hole; 6—Bottom locking ring; 7—Bevel notch; 8—Fastening plate; 81—Upper fastening plate; 811—Tilt angle structure; 82—Lower fastening plate; 821—Rack slot; 9—Extension rod.

Please refer to FIGS. 1 to 5, the specific embodiment of the present invention relates to an S-shaped locking fastener structure, including a locking fastener body 1 which is provided with a vertical fastening plate 8, wherein a box fastening element is arranged on a front side of the fastening plate 8, and a pipe locking element, which is a cylindrical locking fastener with a bevel notch, is arranged on a rear side thereof; the bevel notch divides the locking fastener into a top locking ring 5 and a bottom locking ring 6 from top to bottom, and extension rods 9, through which the length of the fastening plate 8 is adjusted, are connected in the middle of the fastening plate. The box fastening element is provided with a rectangular fastening bayonet which consists of an upper edge 2 and a lower edge 3 which are tilted, wherein the tilt angle is designed into multiple angles according to the usage requirements of the box body, so that the angles for fastening the box body are diversified.

Specifically, the fastening plate 8 includes an upper fastening plate 81 and a lower fastening plate 82 which are connected by the extension rods 9, a joint at a lower end of the upper fastening plate 81 is of a tilt angle structure 811, several rack slots 821 matched with the tilt angle structure 811 are arranged at a joint at an upper end of the lower fastening plate 82, and the tilt angle structure 811 and the rack slots 821 form a buckle structure. When in use, the tilt angle structure 811 of the upper fastening plate 81 is clamped and fastened to the rack slot 821 on an outermost side of the lower fastening plate 82. When the length of the fastening plate 8 needs to be extended, the tilt angle structure 811 is forcibly pushed towards the rack slot 821 on an inner side, so that the tilt angle structure 811 is clamped and fastened to the rack slot 821 on the inner side, thus extending the length of the entire fastening plate 8. When the original length needs to be restored, it only requires a user to forcibly pull the upper fastening plate 81 and the lower fastening plate 82 in opposite directions, so that the tilt angle structure 811 comes out of the rack slot 821 on the inner side and is clamped to the rack slot 821 on the outermost side. Therefore, the buckle is simple in structure, reliable in fixation and convenient to use.

Specifically, a layer of bevel notch 7, which divides the pipe locking element into S-shaped locking fasteners from top to bottom, is arranged in the middle of the pipe locking element. The pipe is internally loaded in the bevel notch 7 and rotated to the inside of the S-shaped locking fastener body, so that the S-shaped locking fastener body clamps an outer wall surface of the pipe, thereby eventually realizing that the S-shaped locking fastener body structure and the pipe are fastened and locked in both upper and lower directions.

Embodiment 4

Please refer to FIGS. 1 to 5, the specific embodiment of the present invention relates to an S-shaped locking fastener structure, including a locking fastener body 1 which is provided with a vertical fastening plate 8, wherein a box fastening element which is provided with a rectangular fastening bayonet is arranged on a front side of the fastening plate 8, and a pipe locking element, which is a cylindrical locking fastener with a bevel notch, is arranged on a rear side thereof; the bevel notch divides the locking fastener into a top locking ring 5 and a bottom locking ring 6 from top to bottom, and extension rods 9, through which the length of the fastening plate 8 is adjusted, are connected in the middle of the fastening plate 8.

Further, the fastening bayonet includes an upper edge 2 and a lower edge 3, and side baffles 4 are arranged on both sides of the upper edge 2 respectively. The upper edge 2 and the two side baffles 4 form an upper bayonet structure with an I-shaped cross section, and the upper bayonet structure is clamped to an external box body through three contact surfaces, thereby increasing the friction force with the contact surfaces of the box body and enhancing the fastening strength of the box body. The lower edge 3 is provided with a horizontal plate perpendicular to the fastening plate 8, and is in direct contact with the box body to form a lower contact surface.

In the specific embodiment 4, the fastening plate 8 includes an upper fastening plate 81 and a lower fastening plate 82 which are connected by the extension rods 9, a joint at a lower end of the upper fastening plate 81 is of a tilt angle structure 811, several rack slots 821 matched with the tilt angle structure 811 are arranged at a joint at an upper end of the lower fastening plate 82, and the tilt angle structure 811 and the rack slots 821 form a buckle structure. When in use, the tilt angle structure 811 of the upper fastening plate 81 is clamped and fastened to the rack slot 821 on an outermost side of the lower fastening plate 82. When the length of the fastening plate 8 needs to be extended, the tilt angle structure 811 is forcibly pushed towards the rack slot 821 on an inner side, so that the tilt angle structure 811 is clamped and fastened to the rack slot 821 on the inner side, thus extending the length of the entire fastening plate 8. When the original length needs to be restored, it only requires a user to forcibly pull the upper fastening plate 81 and the lower fastening plate 82 in opposite directions, so that the tilt angle structure 811 comes out of the rack slot 821 on the inner side and is clamped to the rack slot 821 on the outermost side. Therefore, the buckle is simple in structure, reliable in fixation and convenient to use.

In the specific embodiments 1 to 4, a wear-resistant elastic silica gel layer is arranged on an inner surface of an arc-shaped locking hole 52, which enables the locking fastener to have a buffering effect when being fastened to the pipe, and increases the friction force between the locking fastener and the pipe at the same time, so that the fixation is more reliable. The extension rods 9 are stainless steel tubular extension rods 9 embedded in the fastening plate 8, and the distance between the top locking ring 5 and the bottom locking ring 6 is adjusted by the extension rods 9 so as to adapt to pipe connection in different positions.

The above description of the embodiments is to facilitate a person of ordinary skill in the art to understand and apply the technology of this present invention. Obviously, a person skill in the art can make various modifications to these examples easily, and apply the general principles described herein to other embodiments without paying creative effort. Therefore, the present invention is not limited to the above embodiments, and all improvements and modifications made by a person skill in the art based on the disclosure of the present invention to the present invention, i.e., the changes to the tilt angles and sizes of the upper and lower edges, the setting of the hole position of the locking fastener and the replacement of corresponding technical solutions for different types of boxes or pipes, etc., shall fall within the protection scope of the present invention in case of not beyond the technical effects produced by the technical solution of the present invention.

What is claimed is:

1. An S-shaped locking fastener structure, comprising a locking fastener body which is provided with a vertical fastening plate, wherein a box fastening element which is provided with a fastening bayonet is arranged on a front side of the fastening plate, and a pipe locking element, which is a cylindrical locking fastener with a bevel notch, is arranged on a rear side thereof; the bevel notch divides the locking fastener into a top locking ring and a bottom locking ring from top to bottom, and extension rods, through which a length of the fastening plate is adjusted, are connected in a middle part of the fastening plate.

2. The S-shaped locking fastener structure according to claim 1, wherein the fastening bayonet comprises an upper edge and a lower edge, and side baffles are arranged on both sides of the upper edge respectively.

3. The S-shaped locking fastener structure according to claim 2, wherein the upper edge and the two side baffles form an upper bayonet structure with an I-shaped cross section.

4. The S-shaped locking fastener structure according to claim 3, wherein the upper bayonet structure is clamped to an external box body through at least three contact surfaces.

5. The S-shaped locking fastener structure according to claim 4, wherein the lower edge is provided with a horizontal plate perpendicular to the fastening plate, and is in direct contact with the box body to form a lower contact surface.

6. The S-shaped locking fastener structure according to claim 1, wherein the extension rods are tubular extension rods embedded in the fastening plate; and a distance between the top locking ring and the bottom locking ring is adjusted by the extension rods.

7. The S-shaped locking fastener structure according to claim 6, wherein the fastening plate comprises an upper fastening plate and a lower fastening plate which are connected by the extension rods, a joint at a lower end of the upper fastening plate is of a tilt angle structure, several rack slots matched with the tilt angle structure are arranged at a joint at an upper end of the lower fastening plate, and the tilt angle structure and the rack slots form a buckle structure.

* * * * *